(12) United States Patent
Zhong et al.

(10) Patent No.: US 11,595,128 B2
(45) Date of Patent: *Feb. 28, 2023

(54) CONFIGURING AN OPTICAL NETWORK TERMINATION

(71) Applicant: Cambridge Industries USA, Inc., Santa Clara, CA (US)

(72) Inventors: Yanghong Zhong, Shanghai (CN); Fan Xiong, Shanghai (CN); Binbin Peng, Shanghai (CN); Jili Fu, Cupertino, CA (US)

(73) Assignee: Cambridge Industries USA, Inc., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/475,270

(22) Filed: Sep. 14, 2021

(65) Prior Publication Data

US 2022/0103259 A1 Mar. 31, 2022

Related U.S. Application Data

(63) Continuation-in-part of application No. 17/068,751, filed on Oct. 12, 2020, now Pat. No. 11,146,335.

(30) Foreign Application Priority Data

Sep. 29, 2020 (CN) .......................... 202011055167.X

(51) Int. Cl.
*H04B 10/27* (2013.01)
*H04B 10/40* (2013.01)
(Continued)

(52) U.S. Cl.
CPC .......... *H04B 10/27* (2013.01); *G06F 3/0604* (2013.01); *G06F 3/0629* (2013.01);
(Continued)

(58) Field of Classification Search
CPC ....... H04B 10/27; H04B 10/40; G06F 3/0604; G06F 3/0629; G06F 3/0679; H04L 7/0075
(Continued)

(56) References Cited

U.S. PATENT DOCUMENTS 10,560,190 B2   2/2020 Apetrei
11,146,335 B1 * 10/2021 Zhong .................... H04B 10/40
(Continued)

OTHER PUBLICATIONS

Dalzid E Singh, "Notice of Allowance", dated Jun. 17, 2021, U.S. Appl. No. 17/068,751.

*Primary Examiner* — Dalzid E Singh
(74) *Attorney, Agent, or Firm* — LeonardPatel PC; Sheetal Patel; Michael A. Leonard, II

(57) ABSTRACT

A method for performing ONU Management and Control Interface (OMCI) synchronization includes receiving an OMCI message containing a OLT-G entity identifying OLT's vendor identification (ID) and version. The method also includes determining if an OLT vendor identification (ID) matches with a current vendor ID and if an Optical Line Terminal (OLT) version is compatible with current OMCI handlers. When the OLT vendor ID fails to match with the current vendor ID, automatically performing a OMCI handler switching process. The OMCI handler switching process includes setting a current OLT vendor as a new OLT vendor ID, deleting a OMCI configuration previously stored in the flash memory after setting the new OLT vendor ID, and rebooting the ONT to allow the ONT to initialize a OMCI configuration using a new OMCI profile.

12 Claims, 13 Drawing Sheets

(51) Int. Cl.
*H04B 10/079* (2013.01)
*H04L 7/00* (2006.01)
*G06F 3/06* (2006.01)

(52) U.S. Cl.
CPC ........... *G06F 3/0679* (2013.01); *H04B 10/40* (2013.01); *H04L 7/0075* (2013.01)

(58) Field of Classification Search
USPC ........................................................ 398/135
See application file for complete search history.

(56) References Cited

U.S. PATENT DOCUMENTS

| | | | |
|---|---|---|---|
| 2008/0037986 A1* | 2/2008 | Effenberger | H04L 41/0233 |
| | | | 398/58 |
| 2010/0040371 A1 | 2/2010 | Wu et al. | |
| 2012/0072973 A1 | 3/2012 | Gao et al. | |
| 2012/0128358 A1 | 5/2012 | Zhang et al. | |
| 2015/0318928 A1* | 11/2015 | Yoo | H04J 14/0267 |
| | | | 398/68 |
| 2019/0349086 A1* | 11/2019 | Apetrei | H04Q 11/0067 |

* cited by examiner

100

200

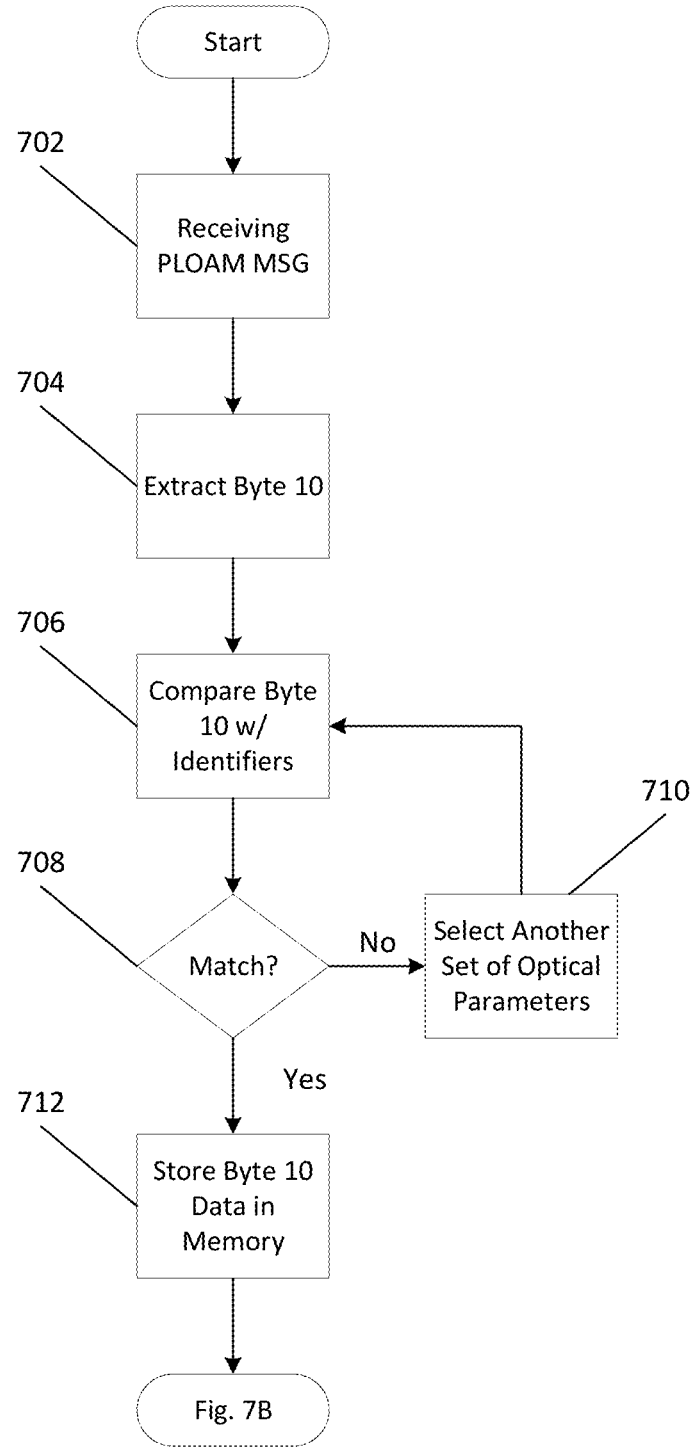

| 10 | xxecmsspp |
|---|---| xx = Reserved.
e = Status of delay pre-equalization mechanism: "0" = No pre-assigned delay, "1" = Use pre-assigned delay given below.
m = Status of SN_Mask mechanism: "0" = SN_Mask disabled, "1" = SN_Mask enabled (Note 5).
ss = Max number of extra SN-transmissions sent in response to a single SN-request. For example, ss = 10 means an ONU will send 3 SN-transmissions when responding to a SN-request (Note 6).
Default ONU transmit power level mode:
pp = "00" – Mode 0: Normal.
pp = "01" – Mode 1: Normal – 3 dB.
pp = "10" – Mode 2: Normal – 6 dB.
pp = "11" – Reserved.
(Note 4)

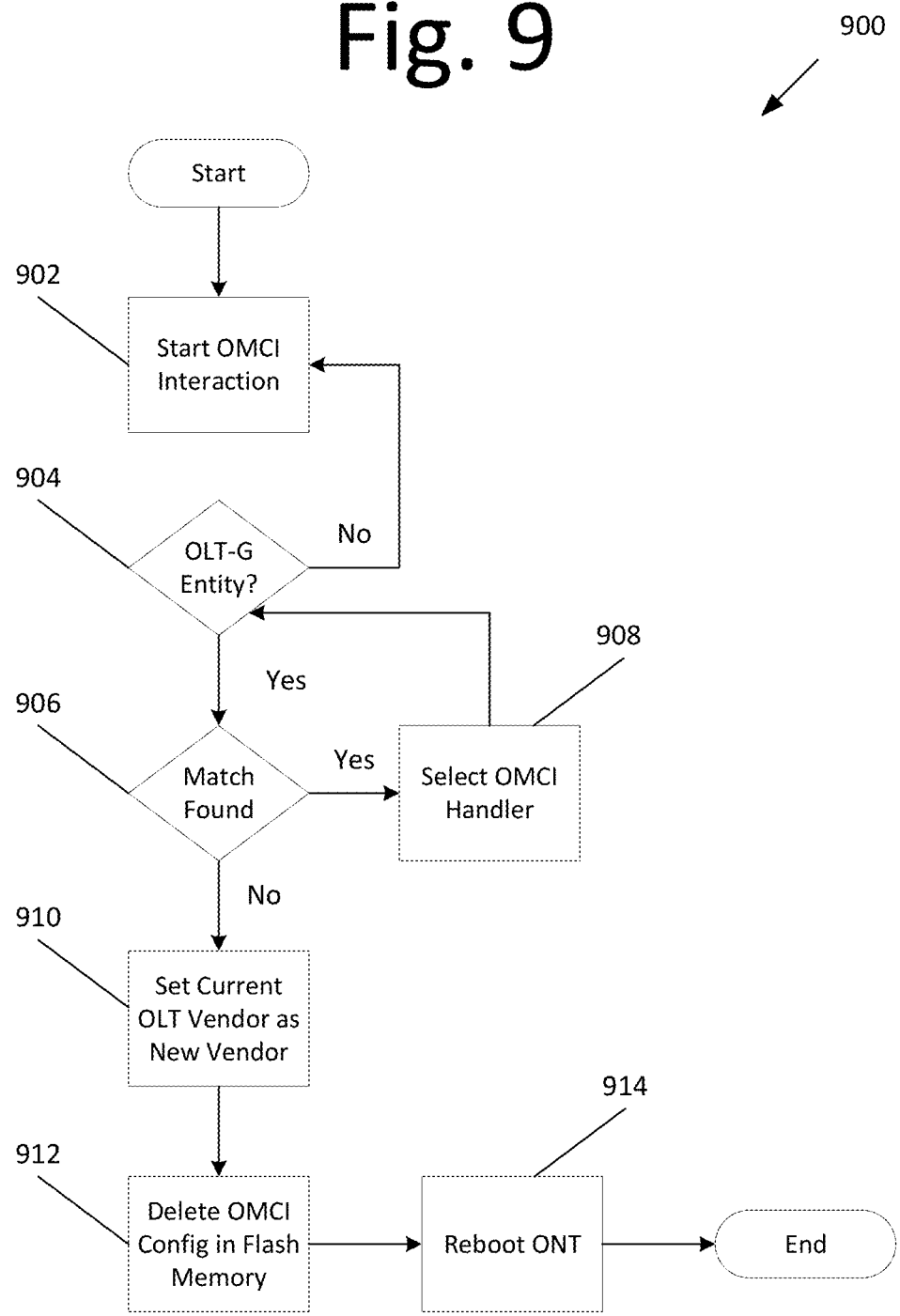

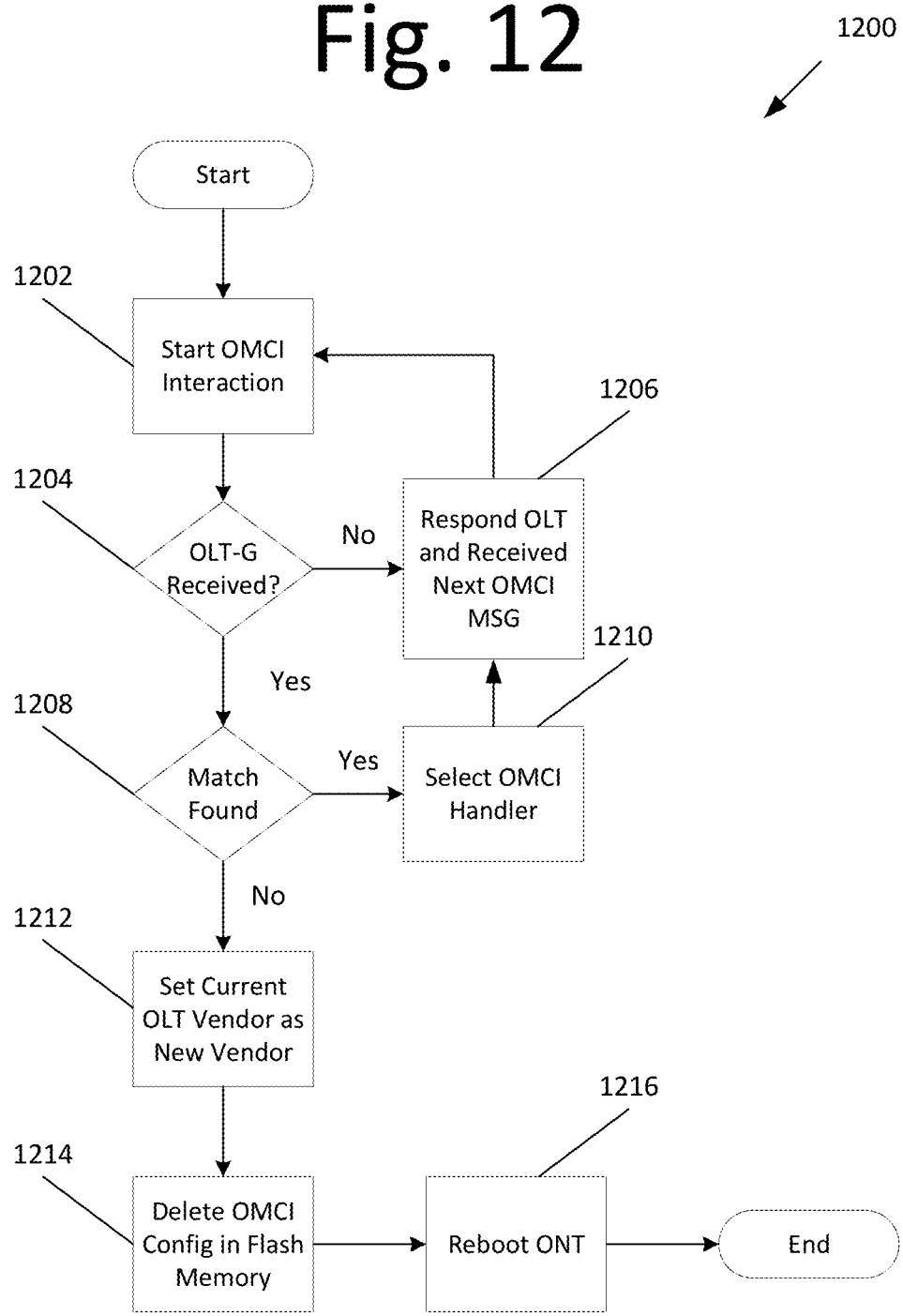

CONFIGURING AN OPTICAL NETWORK TERMINATION

CROSS-REFERENCE TO RELATED APPLICATIONS

This application is a continuation-in-part of, and claims priority to, U.S. application Ser. No. 17/068,751, filed on Oct. 12, 2020. This application incorporates the entirety of the subject matter recited in the above-identified application.

FIELD

The present invention relates to an optical network termination (ONT), and more particularly, to configuring the ONT.

BACKGROUND

In telecommunication, an eye diagram is an oscilloscope display in which a digital signal from a receiver is repetitively sampled and applied to the vertical input, while the data rate is used to trigger the horizontal sweep. See, for example, FIG. 1, which is related art illustrating an eye diagram 100. An eye diagram 100 is a pattern looks like a series of eyes between a pair of rails, and is a tool for evaluating the combined effects of channel noise and inter-symbol interference on the performance of a baseband pulse-transmission system. Further, eye diagram 100 is a synchronized superposition of all possible realizations of the signal of interest viewed within a particular signaling interval.

In an eye diagram, the eye crossing percentage is a measure of an amplitude of crossing points relative to One level and Zero level. See Equation (1) below.

$$\text{Crossing percentage} = \frac{\text{Crossing level} - \text{Zero level}}{\text{One level} - \text{Zero level}} \times 100\% \quad \text{Equation (1)}$$

Crossing point is an indirect measurement of the quality of the eye diagram, and indicates the timing occurrence of One level and Zero level. FIG. 2 is an image 200 illustrating a classic sample how the time of Signal One and Signal Zero impacts the crossing point. For example, image 200 indicates that the crossing point is changed by changing the timing of Signal One and/or that of Signal Zero. In fact, the crossing point is not a parameter that the transceiver can be calibrated directly. It always has to be indirectly impacted by other parameters such as the timing of signals.

In International Telecommunication Union (ITU-T) G.984.2 and its amendment, the crossing percentage of a gigabit-capable passive optical network (GPON) signal eye diagram is never defined as a changeable parameter. FIG. 3, for example, is a diagram 300 illustrating a mast of the eye diagram for the upstream transmission signal. The nominal value of the crossing percentage is marked as 0.5 (or 50%). This implies that the Signal One and Signal Zero shall take equal time. This is also the assumption for many other optical parameters such as the sensitivity, signal penalty, the BER, etc.

Let's take the ONT discussed in U.S. Pat. No. 10,560,190 B2 (the "'190 patent"). In the '190 patent, the crossing point must be calibrated to 40%. Further, the '190 patent suggests that the transceiver has to shorten the timing of Signal One and/or extend the timing of Signal Zero. To keep the transmission rate of the GPON signal, the '190 patent discussing making the wave of Signal One narrower.

This, however, makes the Signal One harder to be detected, or in some cases, may be mistakenly detected as Signal Zero. This change also results in the changes to the sensitivity and the bit error rate (BER) of the transceivers, which are difficult to compensate. Furthermore, the lower crossing percentage results in longer time at lower level of optical power and cause challenges to recover the signal frequency which, in some worst cases, causes the loss of synchronization and potential transmitted bit missing.

Thus, when calibrating ONT's, the following challenges are presented—(1) the crossing point cannot be calibrated directly and (2) the signal quality is reduced, causing additional transmission challenges. For example, this may result in higher BER, lower signal sensitivity, and reduced coverage range.

Thus, an alternative approach other than the use of crossing points may be more beneficial.

Some conventional methods, such as those discussed in the '190 patent, use delimiter bytes when configuring an ONT. However, knowing that delimiter bytes are 24-bit data and are contained in 3 bytes (e.g., Octet 7 to 9) and knowing that a central processing unit (CPU) processes the data of 8-bit, 16-bit, 32-bit, or 64-bit, the data within the delimiter bytes has to be converted to multiple parts of a certain length in order for the data to be processed.

Thus, an alternative approach that uses octet 10, which is 8-bit, may be more beneficial.

SUMMARY

Certain embodiments of the present invention may provide solutions to the problems and needs in the art that have not yet been fully identified, appreciated, or solved by current ONT technologies. For example, some embodiments of the present invention pertain to configuring the ONT.

In an embodiment, a process for configuring an optical network termination (ONT) includes receiving an upstream overhead physical layer operation administration and maintenance (PLOAM) message from an optical line terminal (OLT). The process also includes extracting byte 10 data from the upstream overhead PLOAM message to identify a transceiver type of the OLT, and matching the transceiver type of the OLT with one of a plurality of sets of optical parameters. The process further includes storing the matched transceiver type of the OLT in a double date rate (DDR) memory prior to completing a ranging process with the OLT.

In another embodiment, a method for performing ONU Management and Control Interface (OMCI) synchronization includes receiving an OMCI message containing a OLT-G entity identifying OLT's vendor identification (ID) and version. The method also includes determining if an OLT vendor identification (ID) matches with a current vendor ID and if an Optical Line Terminal (OLT) version is compatible with current OMCI handlers. When the OLT vendor ID fails to match with the current vendor ID, automatically performing a OMCI handler switching process. The OMCI handler switching process includes setting a current OLT vendor as a new OLT vendor ID, deleting a OMCI configuration previously stored in the flash memory after setting the new OLT vendor ID, and rebooting the ONT to allow the ONT to initialize a OMCI configuration using a new OMCI profile.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIGS. 7A and 7B are flow diagrams illustrating a process for performing ranging, according to an embodiment of the present invention.

FIG. 8 is an illustration of an Upstream_Overhead PLOAM message, according to an embodiment of the present invention.

FIG. 9 is a flow diagram illustrating a process for performing ONU Management and Control Interface (OMCI) synchronization, according to an embodiment of the present invention.

FIG. 12 is a flow diagram illustrating a process for performing OMCI synchronization, according to an embodiment of the present invention.

DETAILED DESCRIPTION OF THE EMBODIMENTS

Figure 4:
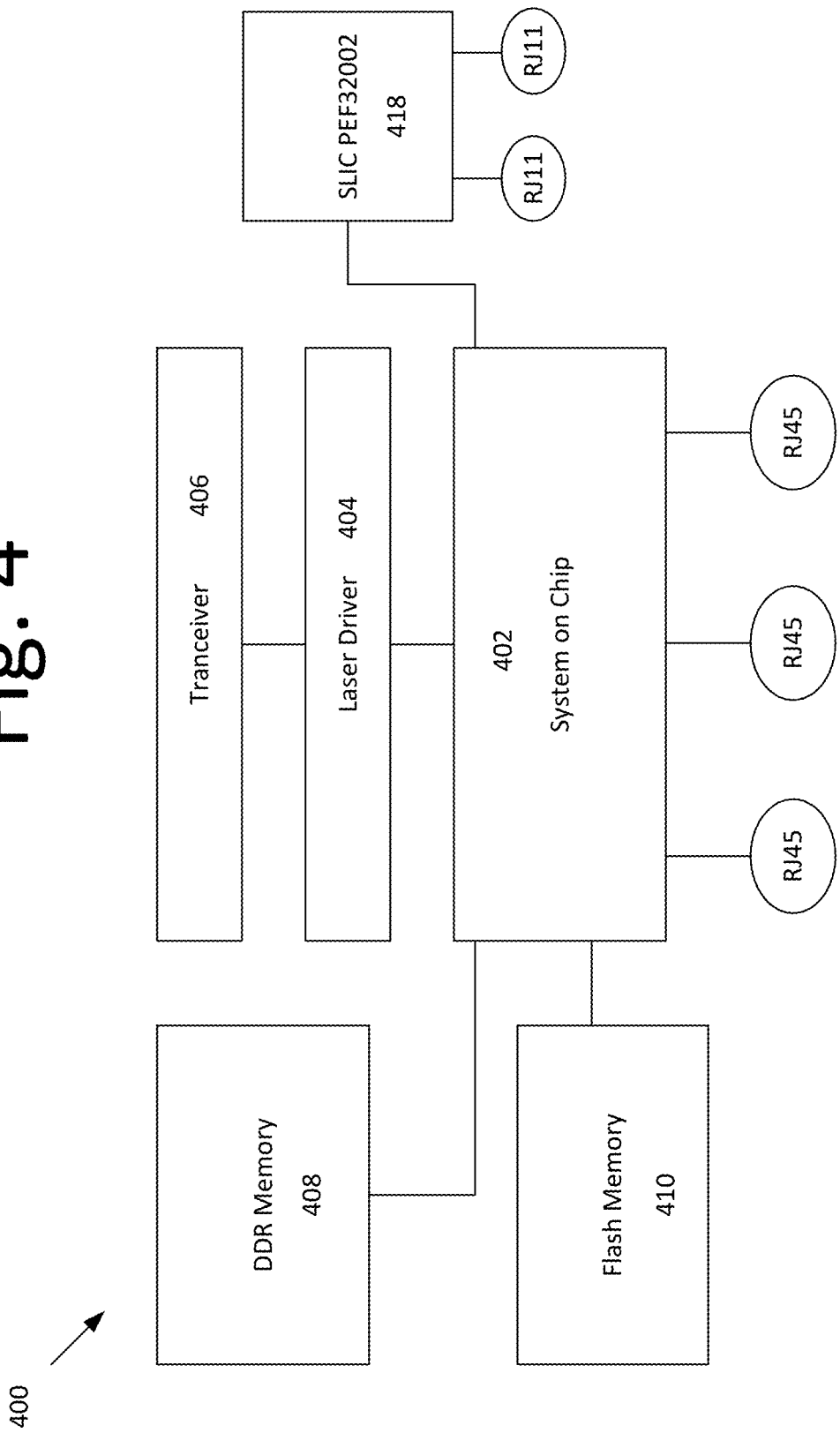
FIG. 4 which is a block diagram illustrating an ONT, according to an embodiment of the present invention.

Some embodiments of the present invention pertain to configuring an ONT. See FIG. 4, which is a block diagram illustrating an ONT 400, according to an embodiment of the present invention. In some embodiments, ONT 400 includes a system on chip (SoC) 402, a laser driver 404, a transceiver 406, DDR memory 408, flash memory 410, a subscriber line interface circuit (SLIC) 418, and a plurality of RJ45 ports.

During operation, transceiver 406 converts data between electrical signals and optical signals. For example, transceiver 406 receives and transmits optical signals to an OLT device (not shown). The optical signals are exchanged with remote equipment, such as the OLT device, via a fiber connected through a fiber connector. The fiber connector may be a standard connector angled physical contact (SC/APC) type or a standard connector ultra-physical contact SC/UPC type connector.

Transceiver 406 may also transmit and receive electrical signals with a laser driver 404. Laser driver 404 in some embodiments decodes the electrical signal. For example, when an electrical signal is received from transceiver 402, laser driver 404 decodes the electronic signal and sends the decoded signal to SoC device 402. Using another example, laser driver 404 encodes data (or a signal) received from SoC device 402 and sends the encoded signal to control transceiver 406.

Using the encoded signal, laser driver 404 may control transceiver 406 by real time micro-managing of transceiver's 406 on and off, its voltage, bias current, modulation current, the level of the signals, etc. The purpose of this is to maintain the optical signals, which transceiver 406 sends and receives, to meet a certain specification of the optical signals. This specification typically defines the range of an eye diagram of the signals, the range of sending and receiving signal power level, the extinction radios, the tolerance to reflected power, the sensitivity, and the recovery time, etc. An example of such specification may be found in the ITU-T G.984.2 and its amendment.

In order to control transceiver 406, laser driver 404 uses a set of optical parameters. See Table 1 below.

TABLE 1

Optical Parameters

| Parameters | Notes |
| --- | --- |
| TX Laser Mode | Select the transmitting mode: Single Loop, Dual Loop, OpenLoop, etc. |
| RX Mode | Select the receiving mode: APD, STIA |
| APC | Auto Power Control for both transmitting and receiving |
| ER | Set targeted ER |
| TX Power | The factors of the compensation curve for TX power |
| RX Power | The factors of the compensation curve for RX power |
| Temp | The factors of the compensation curve for Temp |
| Vcc | The factors of the compensation curve for DC Voltage (receiving and transmitting) |
| TX impedance | Set the transmitting impedance |
| Bias current | The factors of the compensation curve for bias current |
| Mod current | The factors of the compensation curve for modulation current |
| LOS threshold | the threshold of the receiving power of LOS |
| LOS Polarity | Polarity of LOS |
| RX Polarity | Receiving polarity |

It should be appreciated that Table 1 includes a list of optical parameters. However, this list may vary depending on the embodiment.

This set of the optical parameters includes the initiate value of the registers of laser driver 404, which are used by its algorithm to drive transceiver 406 to meet the specifications. The optical parameters also include other factors used by laser driver's 404 algorithm to compensate the signals when needed (e.g., when the environmental temperature changes). Due to the inconsistency of transceiver 406, the values of those optical parameters vary per the type of transceiver 406 being used.

For this reason, a calibration process is required during the manufacturing of ONT 400. The calibration process may find the most suitable set of the parameters to ensure that laser driver 404 drivers transceiver 402 to meet a certain specification of the optical signals, i.e., the specifications under ITU-T G.984.2 and its amendments.

OLT vendors use different optical specifications, or even their proprietary specifications. For this reason, ONT 400 should also adapt to multiple types of OLT transceivers. To adapt to multiple types of the OLT transceivers, during the manufacture process, ONT 400 is calibrated multiple times, and in particular, multiple sets of the optical parameters are stored into flash memory 410. Each set of the optical parameters provides the information necessary for laser driver 404 to drive transceiver 406 to meet the specifications of the optical signals and to allow the OLT and ONT 400 to communicate with each other.

Figure 5:
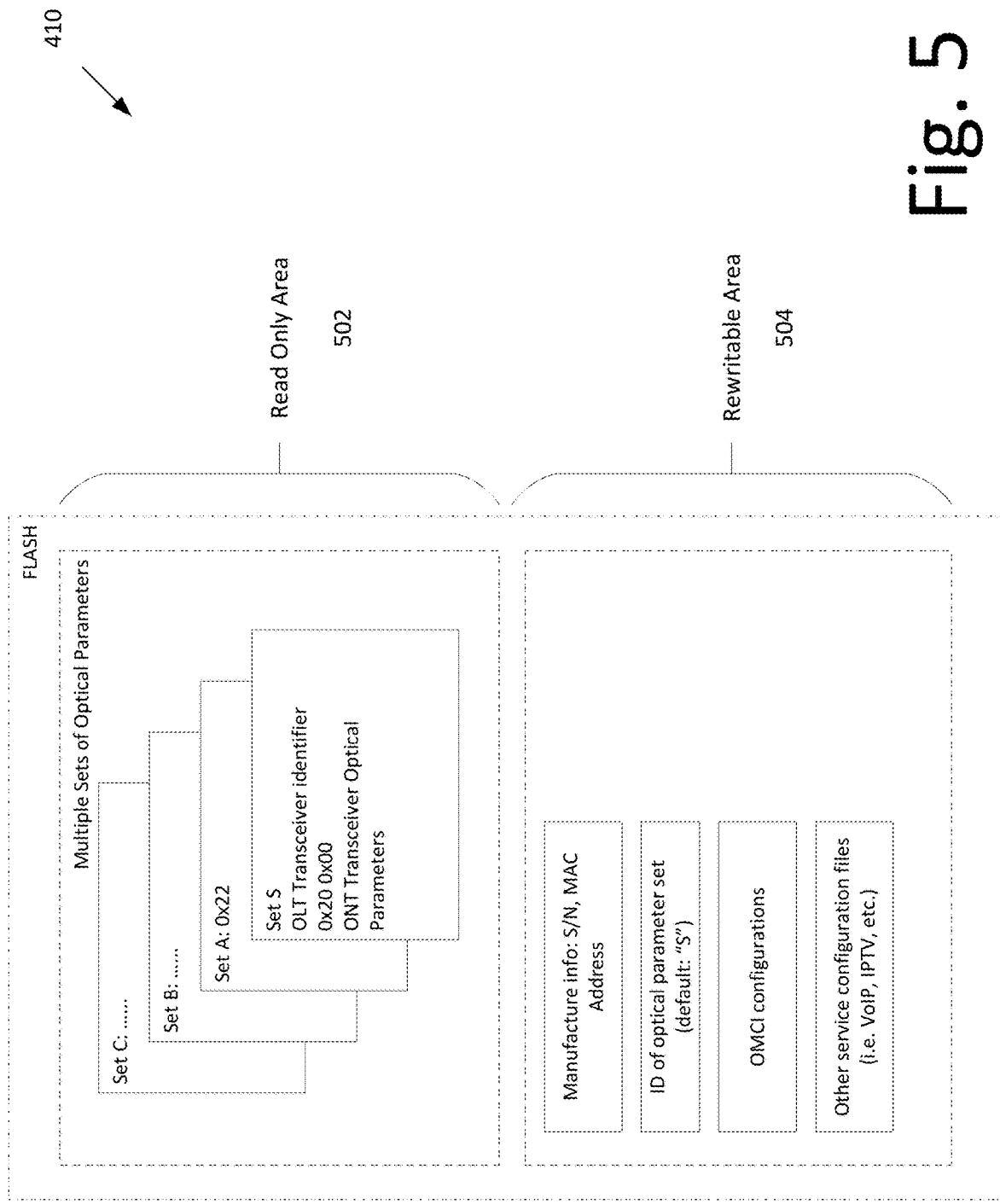
FIG. 5 is a block diagram illustrating flash memory for ONT, according to an embodiment of the present invention.

FIG. 5 is a block diagram illustrating flash memory 410 for ONT 400, according to an embodiment of the present invention. In some embodiments, flash memory 410 includes a read only area 502 and a rewritable area 504. For purposes of configuring the ONT, read only area 502 includes multiple sets of optical parameters, each of which include two parts of the data—(1) OLT transceiver identifier (s) and (2) ONT transceiver optical parameters. The OLT transceiver identifier may be a pattern that identifies the type of OLT transceiver and may decide if the current set of the optical parameters can be used for the OLT transceiver.

Figure 1:
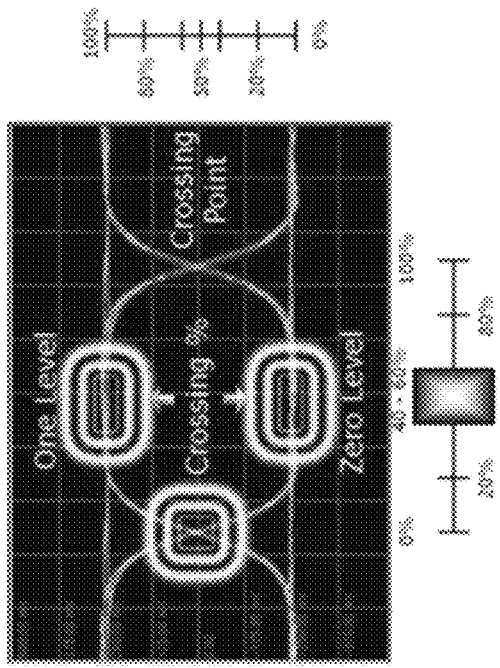
FIG. 1 is related art illustrating an eye diagram.
Figure 2:
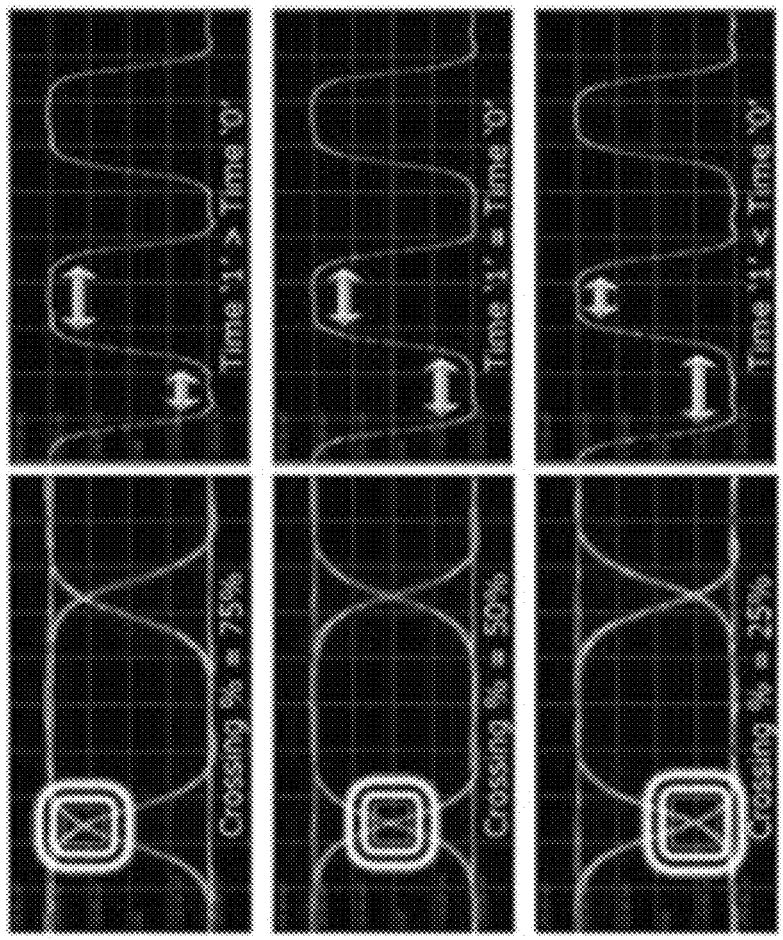
FIG. 2 is an image illustrating a classic sample how the time of Single One and Single Zero impacts the crossing point.
Figure 3:
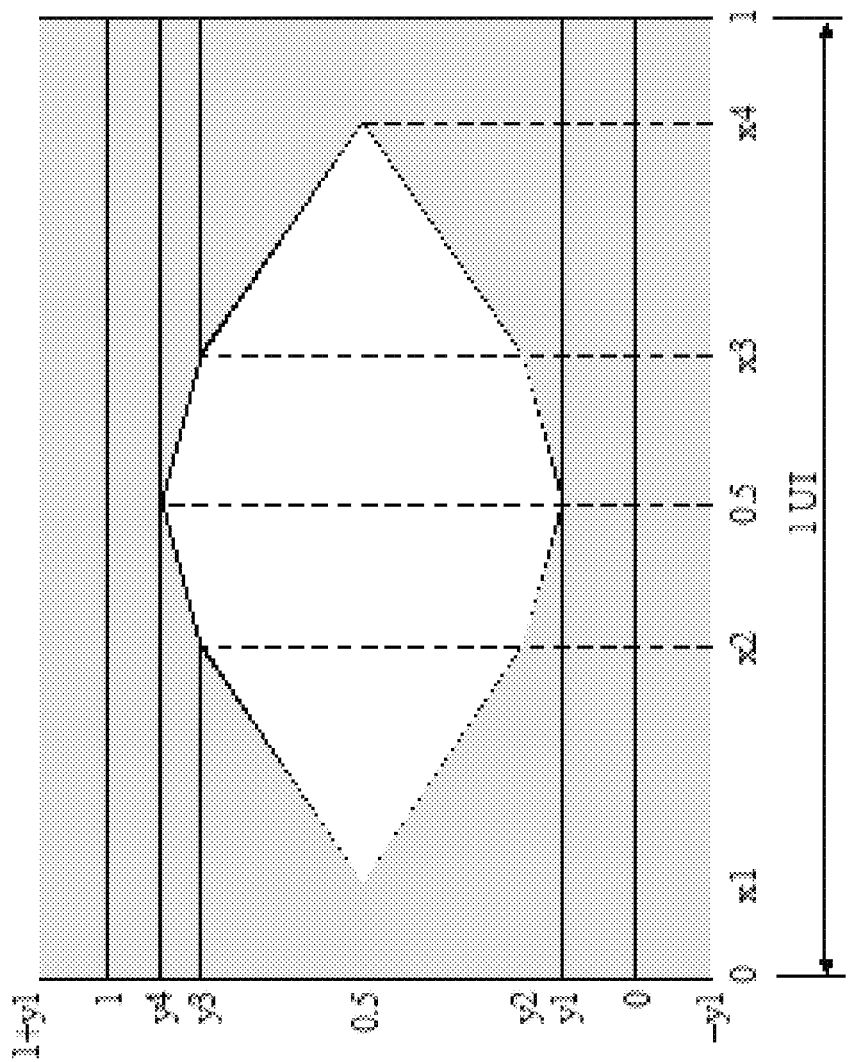
FIG. 3 is a diagram illustrating a mast of the eye diagram for the upstream transmission signal.

Returning to FIG. 3, when the current set of optical parameters matches with the optical parameter read from a message received from the OLT, then the current set of optical parameters is used. Otherwise, SoC device 402 checks the next set of optical parameters stored within flash memory 410. In the event that a match is not found, SoC 402 uses a default set (e.g., the "Set S"), which is typically the set of optical parameters listed under the ITU-T recommendation (ITU-T G.984.2 and its amendment).

SoC device 402 may also determine and send the set of the optical parameters to laser drive 404. In response, laser driver 404 initializes itself and drives the transceiver 406 so transceiver 406 can transmit and receive the optical signals. SoC device 402 may also, based on the configurations and data received, send another set of optical parameters to laser driver 404 to adapt to a different OLT when needed. This is described in more detail later in this application.

Transceiver Calibration

There are multiple algorithms to calibrate the optical parameters. For example, single-loop and dual-loop methods may be used to calibrate the optical parameters. Some embodiments utilize a different algorithm based on the OLT transceiver specifications. For example, a dual-loop algorithm is used for ITU-T standard OLT transceiver (this works for many of the other OLTs). In another example, a single-loop algorithm is used for Arris® OLT transceiver (single loop good for high ER target).

Additionally, there are many parameters that calibrate the ONT during the manufacturing process. This calibration may ultimately impact the behavior of the transceiver. One of the key parameters that help work with different OLTs is the extinction ratio (ER) as defined below.

$$ER(\text{dB}) = 10 \times \log_{10} \frac{\text{One level}}{\text{Zero level}} \quad \text{Equation (2)}$$

The ER measurement may apply to optical signals, and may be defined as a ratio of power level of One level and/or Zero level. By increasing the ER, the signal can be recognized, but may require a higher overall power assumption. It should be noted that the ER may or may not impact the crossing point. Further, the ER is calibrated to 14 dB for Type S OLT transceivers and Type B OLT transceivers, and the ER is calibrated to 18 dB for Type A OLT transceivers.

ONT Initialization Process

The typical ONT initialization process covers the ONT hardware and firmware initialization, and ends when ONT is ready to receive optical signals. However, for purposes of explanation, the initialization process can be extended to or until the ONT is connected to the OLT and is ready to receive OMCI configuration from the OLT.

Returning to FIG. 5, the ONT may store the configurations in rewritable area 504 of flash memory 410. Those configurations include, but are not limited to, an index of the optical parameters set currently being used, the current OMCI profile, the latest OMCI configurations from the OLT, the local configuration files, and application/service configuration, to name a few. Such configurations are stored in rewritable area 504 as it may be changed anytime when the ONT is running. Further, these configurations are stored in flash memory 410 so that, when the ONT reboots, the ONT can retrieve the stored last successful configuration to recover the services much more quickly. For example, in most of the cases, the ONT may still connect to the same OLT and, by using the stored "currently used optical parameters", may not have to try and re-initiate the laser driver with different optical parameter sets (optical parameters will match at the first try). This configuration may always be removed from flash memory 410 without any issue. The ONT may follow the same process to initiate the components and get configured based on the messages from the OLT.

Some of these configurations are defined in the ITU-T recommendations such as ITU-T G.984.3, G.984.4 and G.988. Other configurations may be vendor specific. However, the sets of the optical parameters are stored in read only area 502 of flash memory 410 as such parameters cannot be changed except in the calibration process during the manufacture. Further, potential change to some of the optical parameters may cause problems and may result in the permanent failure to connect to some types of the OLTs.

It should be noted, however, that the parameters the OLT sends through the PLOAM message are not stored in FLASH. Instead, those parameters are stored in DDR memory 408 (or any similar device in which the data will be lost when power off or restarts, such SRAM, DRAM, etc.) of FIG. 4. Such parameters include preambles, delimiters, power level adjustment, ranging time, advanced encryption standard (AES) keys, etc.

The rewritable area 504 of flash memory 410 may, in some embodiments, include manufacture information, such as serial number, MAC address, identifier of the optical parameter set (e.g., default "Set S"), OMCI configurations, and other service configuration files. Such manufacture information are changeable, even though for diagnostics purpose only. Further, such a change would not create a problem for the ONT itself (except OLT may identify it as another one).

Figure 6:
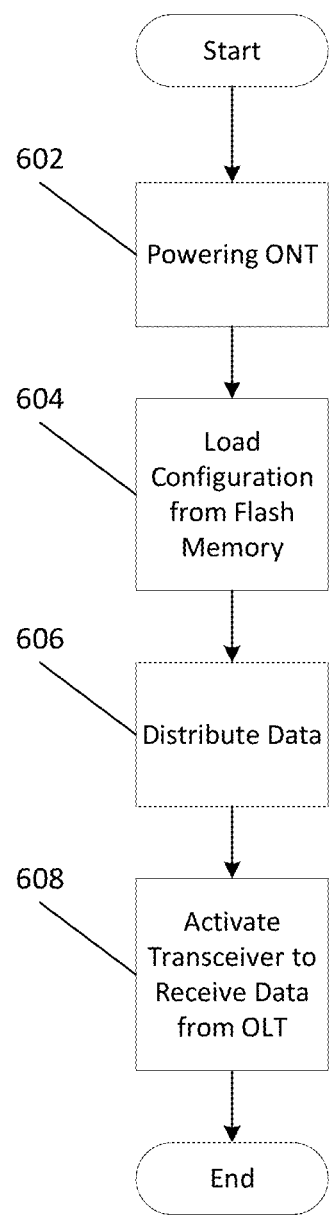
FIG. 6 is a flow diagram illustrating a process for initializing an ONT, according to an embodiment of the present invention.

FIG. 6 is a flow diagram illustrating a process 600 for initializing an ONT, according to an embodiment of the present invention. In some embodiments, process 600 may begin at 602 with powering on the ONT. At 604, the configuration from the rewritable area of flash memory is loaded. Note, in embodiments where the ONT is powered on for the first time, or the in embodiments where ONT is reset to a factory default status, the ONT may not have some of the configuration (e.g., OMCI configuration) preloaded. In those embodiments, ONT uses the default OMCI profile to generate an initialized OMCI configuration, which has no service configured. A default "current OLT transceiver type" is set during manufacturing, which typically point to the set of optical parameters recommended by the ITU-T Recommendation. In other embodiments, the set of optical parameters may be the first set of the optical parameters stored in the read only area of the flash memory.

At 606, after the ONT restores the configurations from the flash memory, the ONT distributes the data to related parts. For example, the optical parameters are sent to laser driver so the laser driver can use those optical parameters to control the transceiver, and later on, compensate the signals based on the laser's driver's internal logic. After applying the restored configuration and data, the transceiver is ready to connect to OLT. At 608, the transceiver is activated to receive data from the OLT, which starts the ranging process (i.e., a handshake mechanism defined in the ITU-T G.984.3).

Figure 7B:
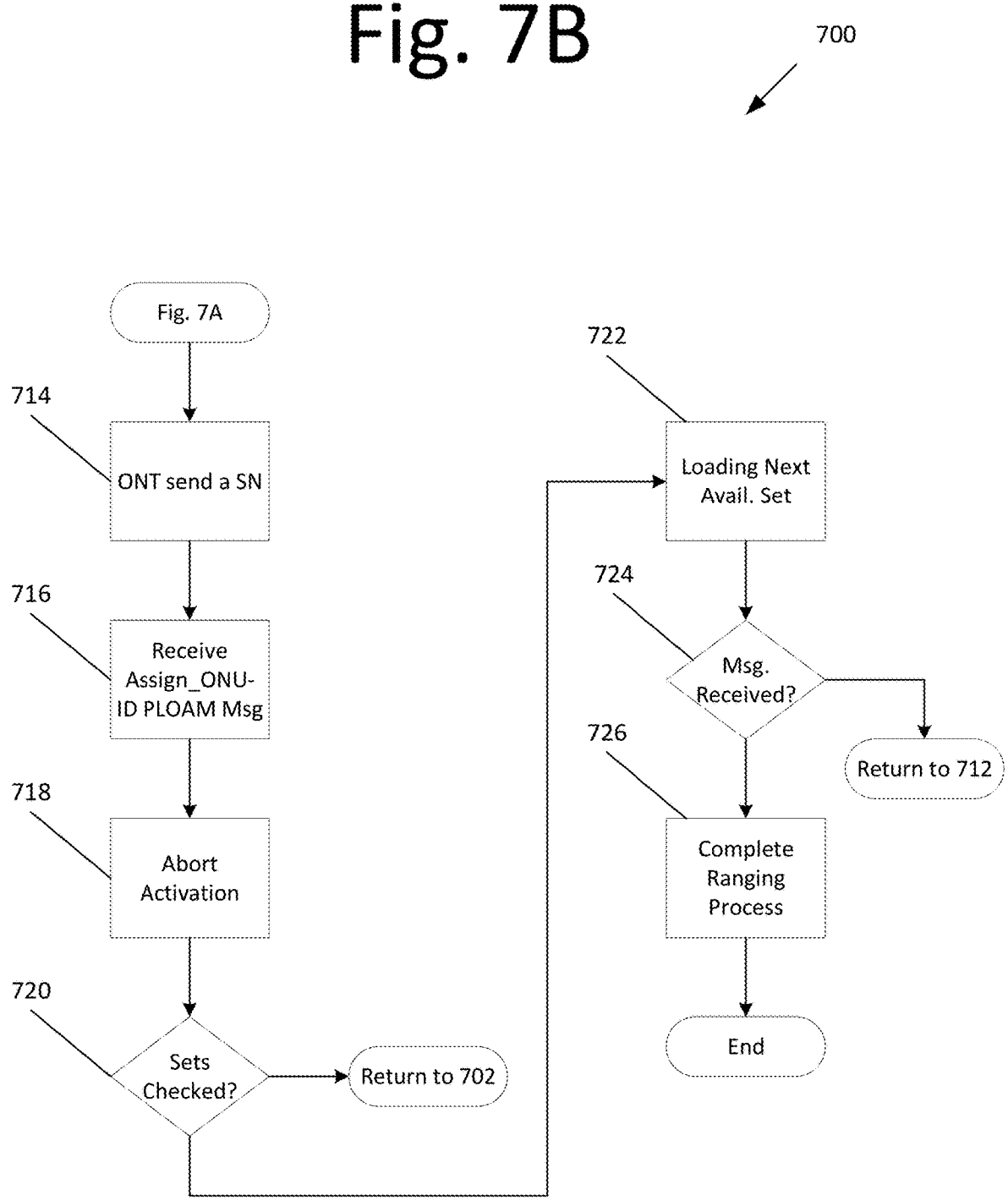

FIGS. 7A and 7B are flow diagrams illustrating a process 700 for performing ranging (i.e., the handshake process between the ONT and the OLT), according to an embodiment of the present invention. In some embodiments, process 700 may begin at 702 with the ONT (i.e., the transceiver) receiving a PLOAM message (e.g., an Upstream_Overhead PLOAM message defined by Section 9.2.3.1 of the ITU-T G.984.3). The PLOAM message may include parameters instructing how the ONT (e.g., transceiver) should send the optical signals so the OLT (e.g., OLT's transceiver or receiver) can recognize those optical signals. These parameters may include preamble bytes, the delimiter bytes, the ONU power level mode, and the pre-assigned delay, to name a few.

FIG. 8 is an illustration of an Upstream_Overhead PLOAM message (or PLOAM message) 800, according to an embodiment of the present invention. In PLOAM message 800, the pattern of Byte 10 identifies the type of the OLT transceivers. For example, a transceiver made by Fiberxon®, which is typically used by Arris®, has identifier 0x22. The transceivers, which are used by ALU® OLTs and Calix® OLTs, have identifier 0x00. The transceiver, which is used by Adtran® OLT, has identifier 0x20.

Returning back to FIG. 7A, the ONT (e.g., the laser driver) extracts Byte 10 data from the PLOAM message at 704. At 706, the ONT (e.g., the SoC) compares the Byte 10 data with the identifier(s) of each set of optical parameters stored in the rewriteable area of the flash memory. See FIG. 5. For example, the ONT selects the first set of optical parameters stored in the rewritable area of the flash memory, and the first set is then compared with the Byte 10 data.

TABLE 1

Upstream_Overhead PLOAM Message
Upstream_Overhead message

| Octet | Content | Description |
|---|---|---|
| 1 | 11111111 | Broadcast message to all ONUs. |
| 2 | 00000001 | Message identification "Upstream_Overhead". |
| 3 | gggggggg | gggggggg = Number of guard bits. |
| 4 | xxxxxxxx | xxxxxxxx = Number of type 1 preamble bits. Type 1 preamble bits contain the 'all-ones' pattern. This may be set to zero. |
| 5 | yyyyyyyy | yyyyyyyy = Number of type 2 preamble bits. Type 2 preamble bits contain the 'all-zeroes' pattern. This may be set to zero. |
| 6 | cccccccc | cccccccc = Pattern to be used for type 3 preamble bits (Note 1). |
| 7 | bbbbbbbb | Data to be programmed in delimiter byte 1 (Notes 2 and 3). |
| 8 | bbbbbbbb | Data to be programmed in delimiter byte 2. |
| 9 | bbbbbbbb | Data to be programmed in delimiter byte 3. |
| 10 | xxemsspp | xx = Reserved:<br>e = Status of delay pre-equalization mechanism: "0" = No pre-assigned delay, "1" = Use pre-assigned delay given below.<br>m = Status of SN_Mask mechanism: "0" = SN_Mask disabled, "1" = SN_Mask enabled (Note 5).<br>ss = Max number of extra SN-transmissions sent in response to a single SN-request. For example, ss = 10 means an ONU will send 3 SN-transmissions when responding to a SN-request (Note 6).<br>Default ONU transmit power level mode:<br>pp = "00"-Mode 0: Normal.<br>pp = "01"-Mode 1: Normal-3 dB.<br>pp = "10"-Mode 2: Normal-6 dB.<br>pp = "11"-Reserved.<br>(Note 4) |
| 11 | dddddddd | MSB of pre-assigned delay (32 byte units). |
| 12 | dddddddd | LSB of pre-assigned delay (32 byte units). |

NOTE 1-The length of Type 3 preamble can be calculated by subtracting the number of bits allocated to guard time, type 1 preamble and type 2 preamble, by the Upstream_Overhead message, as well as 24 bits of the delimiter from the total burst mode overhead time specified in Table 1.2 of [ITU-T G.984.2]
The ONU uses the octet 6 pattern to fill the length of type 3 preamble, aligning the MSB of the pattern with the MSB of the preamble, repeating the pattern as many time as necessary, and leaving any partial pattern adjacent to the delimiter.
NOTE 2-The delimiter pattern occupies the last 24 bits of the burst mode overhead time. In those cases when the actual delimiter is shorter than 24 bits, it is the responsibility of the OLT to specify the pattern in octet 7 so that its MSB can serve as the latter part of the preamble.
NOTE 3-For 16-bit delimiters, these values are proposed: 0x85B3, 0x8C5B, 0xB433, 0xB670 and 0xE6D0. For 20-bit delimiter, 0xB5983 is proposed.
NOTE 4-Be mindful that the coding of the power level modes in the upstream overhead message, where 0 is highest and 2 is lowest, is opposite to that in the Serial_Number_ONU message.
NOTE 5-As the Serial_Number_Mask message has been deprecated, the m bit shall be set to 0.
NOTE 6-As multiple SN transmission method has been effectively deprecated, ss bits shall be set to 00.

At 708, the ONT (i.e., the SoC) determine if the Byte 10 data matches with one of the identifier(s) in the selected first set of optical parameters. If a match is not found, then at 710 the ONT selects (or loads) another set of optical parameters stored in the read only area of the flash memory and compares the selected other set of optical parameters with the Byte 10 data. Note, this process may continue until a match is found.

If, however, a match is found, then at 712, the ONT stores the Byte 10 data in the DDR memory and waits for a serial number (SN) request from the OLT. The SN request message is a special BWmap entry defined in Section 10.2.5.2 of ITU-T G.984.3. It should be appreciated that the BWmap, sending in downstream from OLT to ONT, is typically used for the OLT to allocate the time slot of the ONT transmission in an upstream direction (e.g., sending data from the ONT to the OLT). However, when the BWmap is used as SN request message, the BWmap may be defined as such, not only grant an exact time slot for the ONT to send the Serial_Number_ONU PLOAM message, but also indicate that only the Serial_Number_ONU PLOAM message can be sent. All ONTs, which are waiting for the SN request message, can send the Serial_Number_ONU PLOAM message at this stage. Those already are assigned ONU-ID are not be allowed to send Serial_Number_ONU PLOAM message. Those are not yet ready to receive SN request (i.e., those that have not yet receive Upstream_Overhead PLOAM message) are not be allowed to send Serial_Number_ONU PLOAM message. At 714, upon receipt of the SN request from the OLT, the ONT (i.e., the transceiver) sends the SN via a Serial_Number_ONU PLOAM message. In some embodiments, the Serial_Number_ONU PLOAM message is defined in Section 9.2.4.1 of ITU-T G.984.3).

At 716, the ONT receives an Assign_ONU-ID PLOAM message from the OLT. The Assign_ONU-ID PLOAM message may be defined in Section 9.2.3.3 of ITU-G.984.3. At 718, if ONT does not receive Assign_ONU-ID PLOAM message within a predefined time period (e.g., 10 seconds in some embodiments), the ONT aborts the activation attempt and waits for SN request again before sending the SN via a Serial_Number_ONU PLOAM message one more time. In this case, the ONT checks at 720 if all sets of optical parameters have been tried, and if all sets have been tried, then process 700 returns to step 702. In an alternative embodiment, ONT may wait for SN request from the OLT and try one more time with a new set of optical parameters. In such an embodiment, when all sets of parameters are tried, the process may then return to step 702. This alternative embodiment does not impact the OLT's behavior as defined in ITU-T Specification.

Otherwise, process 700 continues to step 722 with the ONT loading the next available set of optical parameters. At 724, when the ONT fails to receive the Assign_ONU-ID PLOAM message from the OLT within a predefined time period, process 700 returns to step 712.

If, however, the ONT receives the Assign_ONU-ID PLOAM message within the predefined time period, then at 726, the ONT completes the ranging process with the OLT. When the ONT receives the Assign_ONU-ID PLOAM message, the ONT may expect another special BWmap entry—ranging request. The ranging request, similar to SN request but for a particular ONU-ID, grants an exact time slot for that particular ONT to send Serial_Number_ONU PLOAM message one more time. This may allow the OLT, based on the response time, to calculate the distance between the OLT and ONT and compensate the transmission delay caused due to the distances. Such compensation may be set to the ONT by the Ranging Time PLOAM message. ONT completes the ranging process when receives the Ranging Time PLOAM message from OLT. This process may be defined in ITU-T G.984.3. Upon completion of the ranging process, the ONT may begin the OMCI synchronization process.

OMCI Synchronization

Even though the same OLT transceiver is used, the OMCI profile may be different depending on the vendor. To automatically adapt different OLTs, ONT may also detect the OLT's OMCI profile and switch automatically. FIG. 9 is a flow diagram illustrating a process 900 for performing OMCI synchronization, according to an embodiment of the present invention.

In some embodiments, process 900 may begin at 902 with the ONT starting the OMCI interaction with the OLT. For example, the ONT receives the OLT-G OMCI message from the OLT. The OLT-G OMCI message may include OLT's vendor ID, equipment ID, version, etc.

9.12.2 OLT-G

This optional ME (Managed Entity, this is a term in ITU-T G.988) identifies the OLT to which an ONU is connected. This M E provides a way for the ONU to configure itself for operability with a particular OLT. It also provides a way for the OLT to communicate the time of day to the ONU.

An ONU that supports this ME automatically creates an instance of it. Immediately following the start-up phase, the OLT should set the ONU to the desired configuration. Interpretation of the OLT vendor ID, equipment ID and version attributes is a matter for negotiation between the two vendors involved.

Relationships

The single instance of this ME is associated with the ONU ME.

Attributes

Managed entity ID: This attribute uniquely identifies each instance of this ME. There is only one instance, number 0. (R) (mandatory) (2 bytes)

OLT vendor ID: This attribute identifies the OLT vendor. It is the same as the four most significant bytes of an ONU serial number specified in the respective TC layer specification. Upon instantiation, this attribute comprises all spaces. (R, W) (mandatory) (4 bytes)

Equipment ID: This attribute may be used to identify the specific type of OLT. The default value of all spaces indicates that equipment ID information is not available or applicable to the OLT being represented. (R, W) (mandatory) (20 bytes)

Version: This attribute identifies the version of the OLT as defined by the vendor. The default left-justified ASCII string "0" (padded with trailing nulls) indicates that version information is not available or applicable to the OLT being represented. (R, W) (mandatory) (14 bytes)

Time of day information: This attribute provides the information required to achieve time of day synchronization between a reference clock at the OLT and a local clock at the ONU. This attribute comprises two fields: the first field (4 bytes) is the sequence number of the specified GEM superframe. The second field (10 bytes) is TstampN as defined in clause 10.4.6 of [ITU-T G.984.3], clause 13.2 of [ITU-T G.987.3] and clause 13.2 of [ITU-T G.989.3], using the timestamp format of clause 5.3.3 of [IEEE 1588]. The value 0 in all bytes is reserved as a null value. (R, W) (optional) (14 bytes)

NOTE—In ITU-T G.987/ITU-T G.989 systems, the superframe count field of the time of day information attribute contains the 32 LSBs of the actual counter.

Actions
Get, set
Notifications
None.

At 904, the ONT determines if the OMCI message contained the OLT-G entity identifying the OLT's vendor. In some embodiments, the OLT-G is considered as the OLT vendor identification (ID). If the OMCI message does not contain the OLT-G entity, process 900 may then return back to step 902 with the ONT waiting for receipt of a new OMCI message from the OLT.

If the OMCI message contained the OLT-G entity, the ONT determines if the OLT vendor ID matches with the current vendor ID at 906. The current vendor ID may be stored in the rewritable area of flash memory as a part of the local copy of OMCI configuration. If the OLT vendor ID matches with the current vendor ID, then at 908, the ONT selects a OMCI handler based on the version identified in the OLT-G entity and return to step 904 waiting for another OMCI message.

At 910, if the OLT vendor ID does not match with the current vendor ID, then the ONT sets (or updates) the current OLT vendor as the new vendor ID and stores the new vendor ID in rewritable area of flash memory.

At 912, after updating the new vendor ID, the ONT deletes the OMCI configuration stored in the flash memory (except the current OLT vendor which was updated in previous step). At 914, the ONT is then rebooted, allowing the ONT to initialize the OMCI configuration using the new OMCI profile.

In some embodiments, the ONT checks the version of OLT via Attribute "Version (14 bytes)" of OLT-G entity to decide the correct parsing procedure and function for OLT configuration. This may be implemented by selecting different callbacks base on OLT-G Version Attribute, which does not require a reboot. In these embodiments, the checking may take place at 908. As defined in OLT-G entity, the vendor ID and the version are both configurable. When the ONT receives an OLT-G message, even though the vendor ID remains the same, ONT may still check the version info to see if the OMCI handler/callbacks shall be changed. It often happens when the OLT is upgraded to a new version, which request a different implementation for some certain configurations at the ONT.

Also, in some embodiments, process 900 does not connect to the previous optical parameters since the OLT transceiver it typically pluggable. The optical parameters are determined by the transceiver type and not OLT vendor. Note, however, the OMCI profile is determined by the OLT vendors as the OMCI profile relies on the firmware of OLT system.

Figure 10:
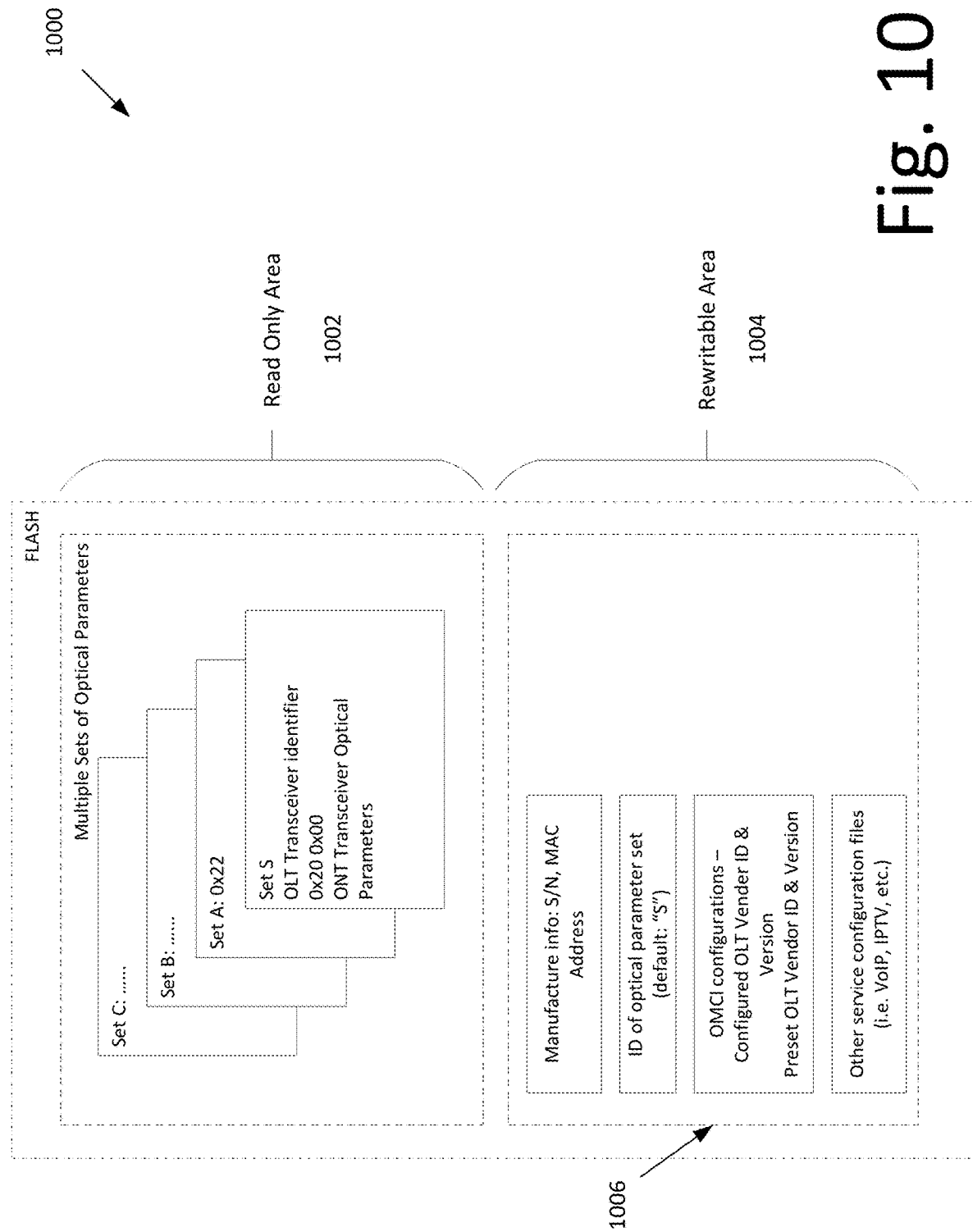
FIG. 10 is a block diagram illustrating OMCI profiles stored in the flash memory for the ONT, according to an embodiment of the present invention.

FIG. 10 is a block diagram illustrating OMCI profiles stored in the flash memory 1000 for the ONT, according to an embodiment of the present invention. As discussed, flash memory 1000 includes read only area 1002 and rewritable area 1004. Within rewriteable area 1004 includes OMCI profile 1006 includes a set of data used to initialize OMCI configuration, and a set of APIs used to react to some certain OMCI configurations for a particular OLT. The standard OMCI profile is defined by ITU-T G.988 recommendation and its amendments. However, many OLT vendors extend or modify the definition of the "standard" recommendation in the implementation. Such modifications may also change from one OLT release to another. The data that used to initialize OMCI configuration includes the default value of the OMCI entities defined in the ITU-T recommendation as well as those vendor specific entity extensions, and also the vendor specific value such as the slot ID, equipment information, etc. The APIs are used to react or behave according to the OMCI configurations which, even for the same configuration, the ONT's behaviors may be different from one OLT to another or from one OLT version to another. For example, the same VLAN classification configuration may result to different VLAN classification behavior depending on the OLT vendor ID and OLT version.

Due to the facts that many of OLT vendors expects different initial OMCI configurations and behavior to an OMCI configuration, the vendor specific OMCI profiles are defined and included in ONT firmware and identified such profiles based on the vendor ID and also (optional) OLT version. Such profiles are hardcoded in the ONT firmware which stored in the flash memory of the ONT.

It should be appreciated that during the manufacture process, a default vendor ID and OLT version can be preset in the manufacture data.

When the ONT boots up (see FIG. 6, step 604), ONT detects if an OMCI configuration exists from previous operation. If ONT operated before with an OLT, the OMCI configuration is stored in the flash memory. This may not be the case in embodiments where a reset to factory default is made. If the configuration exists, the ONT restores the OMCI configuration from flash memory before trying to sync up with OLT. This helps ONT recover the last successful configuration quickly. Depending on the OLT's implementation, the recovery time may be reduced by 10 to 30 seconds. If the configuration does not exist, ONT initializes the OMCI configuration and API based on the preset vendor ID and OLT version. If there is no preset vendor ID, the standard OMCI profile is used.

Figure 11:
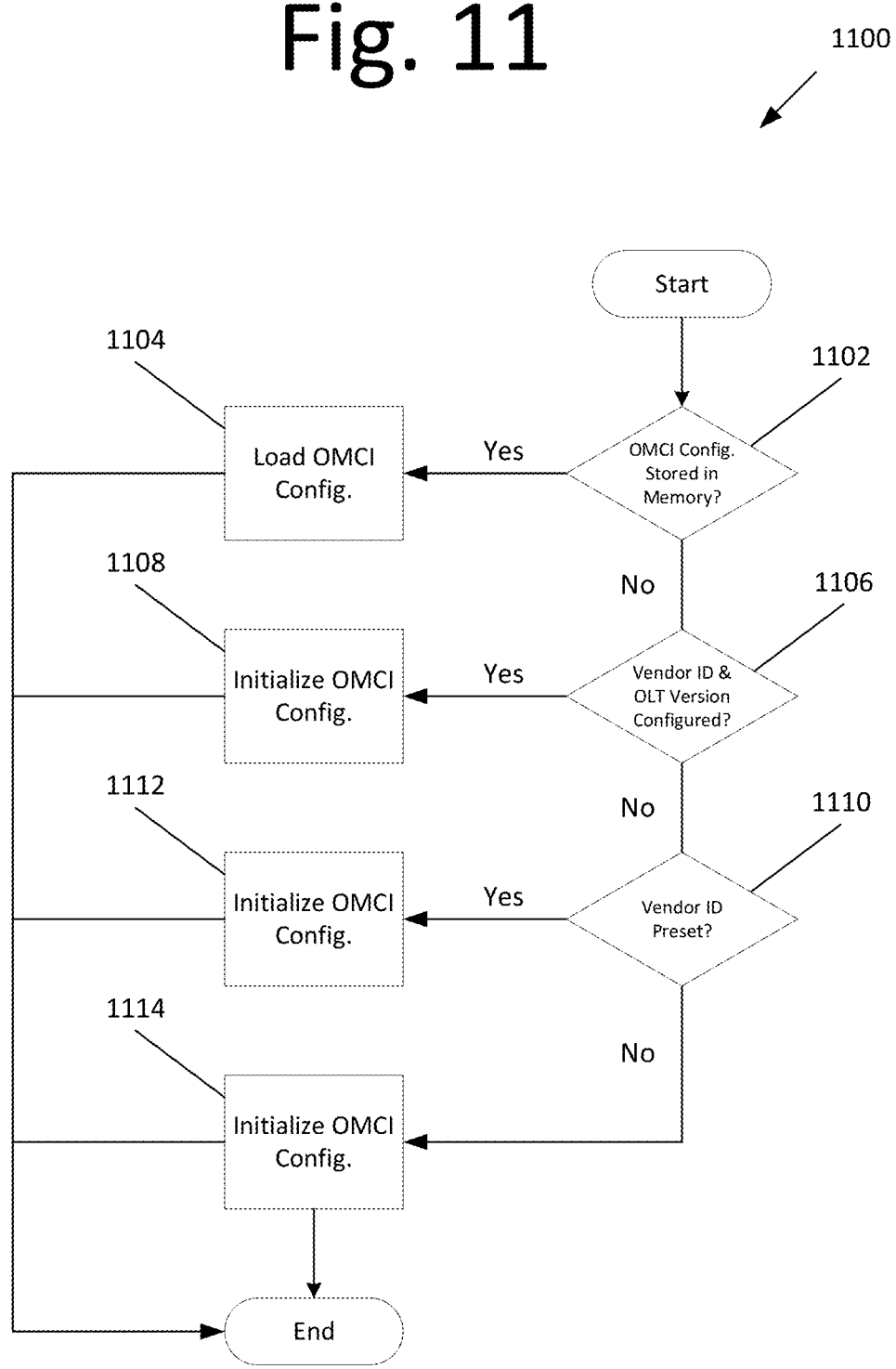
FIG. 11 is a flow diagram illustrating OMCI configuration recovery per OMCI profiles stored in the flash memory for the ONT, according to an embodiment of the present invention.

Following figure describes the details associated with step 604 of FIG. 6, i.e., how the OMCI configuration is restored or initialized based on the different OMCI profiles. FIG. 11 is a flow diagram illustrating a process 1100 for OMCI configuration recovery per OMCI profiles, according to an embodiment of the present invention. Process 1100 may begin at 1102 with determining if the OMCI configuration is previously stored in the flash memory. If the OMCI configuration is stored therein, the OMCI configuration is loaded from the flash memory at 1104, completing the loading process. If, however, the OMCI configuration is not stored in flash memory, then at 1106, the OLT determines if the vendor ID and the OLT version will be configured. In some embodiments, OLT sets the OLT-G ME Value. When the vendor ID and OLT version is configured, then at 1108, the OMCI configuration is initialized, thereby completing the loading process. For example, the OMCI profile per configured vendor ID and OLT version is used to initialize the OMCI configuration.

Otherwise, at 1110, the ONT determines if the vendor ID is preset during the manufacturing process. If so, at 1112, the OMCI profile per preset vendor ID and OLT version is used to initialize the OMCI configuration, thereby completing the loading process. If, however, the ONT determines that the vendor ID is not preset, the standard OMCI profile is used at 1114 to initialize the OMCI configuration, thereby completing the loading process. In some embodiments, If the OLT has not configured OLT-G, ONT uses pre-set value during the manufacturing process.

In some embodiments, when the ONT is started, the OMCI configuration is synchronized with the OLT and the ONT receives an OMCI message containing an OLT-G entity identifying a vendor of OLT and also the OLT version. In these embodiments, the ONT determines if the OLT vendor ID matches with the currently used vendor ID and determines if the OLT version is compatible with the OMCI profile it currently uses. If the OLT vendor ID fails to match or the OLT version is not compatible with the OMCI profile, ONT updates the OLT vendor ID, deletes the previously stored OMCI configuration from flash memory, and selects a new OMCI profile. The ONT is then rebooted, allowing the ONT to initialize the OMCI configuration using this new OMCI profile.

FIG. 12 is a flow diagram illustrating a process 1200 for performing OMCI synchronization, according to an embodiment of the present invention. In some embodiments, process 1200 may begin with starting the OMCI interaction by receiving OLT OMCI messages at 1202. At 1204, the ONT determines if OLT-G information is received from OLT. If not, the ONT responds with the next OLT and receives the next OMCI message at 1206, and returns to step 1204.

If the OLT-G information is received from the OLT, then at 1208, the ONT determines if the OLT vendor matches current vendor ID, and if the OLT version is compatible with current OMCI handlers. If there is a match, the OMCI handler is selected based on a version of the OLT-G at 1210. If a match does not exist, then the current OLT vendor is set to equal to new vendor ID at 1212, and the OMCI configuration is deleted from the flash memory at 1214. At 1216, the ONT is then rebooted, allowing the ONT to initialize the OMCI configuration using this new OMCI profile.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A method for performing ONU Management and Control Interface (OMCI) synchronization, the method comprising:
   receiving an OMCI message containing a OLT-G entity identifying OLT's vendor identification (ID) and version;
   determining if an OLT vendor identification (ID) matches with a current vendor ID and if an Optical Line Terminal (OLT) version is compatible with current OMCI handlers;
   when the OLT vendor ID fails to match with the current vendor ID, automatically performing a OMCI handler switching process, wherein the OMCI handler switching process comprises
   setting a current OLT vendor as a new OLT vendor ID;
   after setting the new OLT vendor ID, deleting a OMCI configuration previously stored in the flash memory; and
   rebooting the ONT, allowing the ONT to initialize a OMCI configuration using a new OMCI profile.

2. The method of claim 1, further comprising:
   determining if the OMCI configuration is previously stored in the flash memory; and
   when the OMCI configuration is stored in the flash memory, loading the OMCI configuration is loaded from the flash memory, completing an OMCI loading process.

3. The method of claim 2, further comprising:
   when the OMCI configuration is not stored in the flash memory, determining, by the OLT, if the vendor ID and the OLT version will be configured; and
   when the vendor ID and OLT version is configured, initializing the OMCI configuration, thereby completing the OMCI loading process, wherein
   the initializing of the OMCI configuration comprises using the OMCI profile per configured vendor ID and OLT version to initialize the OMCI configuration.

4. The method of claim 3, further comprising:
   determining, by the ONT, if the vendor ID is preset during the manufacturing process; and
   when the vendor ID is preset, using the OMCI profile per preset vendor ID and OLT version to initialize the OMCI configuration, thereby completing the loading process.

5. The method of claim 4, further comprising:
   when the ONT determines that the vendor ID is not preset, using a standard OMCI profile to initialize the OMCI configuration, thereby completing the loading process.

6. The method of claim 4, further comprising:
when ONT determines that the OLT has not configured OLT-G, using, by the ONT, a pre-set value during the manufacturing process.

7. A system configured to perform ONU Management and Control Interface (OMCI) synchronization, the system comprising:
an optical network termination (ONT) configured to
receive an OMCI message containing a OLT-G entity identifying OLT's vendor identification (ID) and version, and
determine if an OLT vendor identification (ID) matches with a current vendor ID and if an Optical Line Terminal (OLT) version is compatible with current OMCI handlers, wherein
when the OLT vendor ID fails to match with the current vendor ID, automatically perform a OMCI handler switching process, wherein
the OMCI handler switching comprises
setting a current OLT vendor as a new OLT vendor ID;
after setting the new OLT vendor ID, deleting a OMCI configuration previously stored in the flash memory; and
rebooting the ONT, allowing the ONT to initialize a OMCI configuration using a new OMCI profile.

8. The system of claim 7, wherein the ONT is further configured to
determine if the OMCI configuration is previously stored in the flash memory, and
when the OMCI configuration is stored in the flash memory, load the OMCI configuration from the flash memory, completing an OMCI loading process.

9. The system of claim 8, wherein the OLT is configured to
when the OMCI configuration is not stored in the flash memory, determine if the vendor ID and the OLT version is to be configured, and
when the vendor ID and OLT version is to be configured, initialize the OMCI configuration, thereby completing the OMCI loading process, wherein
the initializing of the OMCI configuration comprises using the OMCI profile per configured vendor ID and OLT version to initialize the OMCI configuration.

10. The system of claim 9, wherein the ONT is further configured to
determine if the vendor ID is preset during the manufacturing process, and
use the OMCI profile per preset vendor ID and OLT version to initialize the OMCI configuration, thereby completing the loading process, when the vendor ID is preset.

11. The method of claim 10, wherein the ONT is configured to use a standard OMCI profile to initialize the OMCI configuration, thereby completing the loading process, when the vendor ID is not preset.

12. The system of claim 10, wherein the ONT is further configured to use a pre-set value during the manufacturing process, when the OLT has not configured OLT-G.

* * * * *